United States Patent
Li et al.

(10) Patent No.: US 10,805,120 B2
(45) Date of Patent: Oct. 13, 2020

(54) ADAPTIVE FREQUENCY CORRELATION ESTIMATION FOR CHANNEL ESTIMATION

(71) Applicant: APPLE INC., Cupertino, CA (US)

(72) Inventors: Yang Li, Plano, TX (US); Zhu Ji, San Jose, CA (US); Johnson O Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/696,956

(22) Filed: Sep. 6, 2017

(65) Prior Publication Data

US 2019/0074996 A1   Mar. 7, 2019

(51) Int. Cl.
  *H04L 25/02*   (2006.01)
  *H04L 12/26*   (2006.01)
  *H04W 88/02*   (2009.01)

(52) U.S. Cl.
  CPC ........ *H04L 25/022* (2013.01); *H04L 25/0222* (2013.01); *H04L 25/0232* (2013.01); *H04L 43/08* (2013.01); *H04L 43/14* (2013.01); *H04W 88/02* (2013.01)

(58) Field of Classification Search
  CPC ....... H04L 25/022; H04L 43/14; H04L 43/08; H04W 88/02
  See application file for complete search history.

(56) References Cited

U.S. PATENT DOCUMENTS

| | | | | |
|---|---|---|---|---|
| 2009/0245338 A1* | 10/2009 | Jonsson | ............... | H04L 25/0204 375/224 |
| 2010/0074358 A1* | 3/2010 | Khojastepour | ..... | H04L 25/0204 375/267 |
| 2011/0310994 A1* | 12/2011 | Ko | ........................ | H04B 7/0639 375/295 |
| 2012/0177142 A1* | 7/2012 | Wagner | ................ | H04B 7/0452 375/296 |
| 2012/0307939 A1 | 12/2012 | Kalyani et al. | | |
| 2013/0202059 A1* | 8/2013 | Kim | .................... | H04L 25/0391 375/295 |
| 2014/0241232 A1* | 8/2014 | Damji | ................. | H04L 25/0204 370/312 |
| 2014/0348120 A1* | 11/2014 | Kant | ..................... | H04L 1/1835 370/329 |
| 2015/0334656 A1* | 11/2015 | Ji | ...................... | H04W 52/0245 370/252 |
| 2017/0079047 A1* | 3/2017 | Lee | ...................... | H04B 7/0413 |

\* cited by examiner

*Primary Examiner* — Lakeram Jangbahadur
(74) *Attorney, Agent, or Firm* — Fay Kaplun & Marcin, LLP

(57) ABSTRACT

A method is disclosed where a user equipment ("UE") determines a value of a first parameter and determines a value of a second parameter to select a regularization method for correlation estimate values based on the first parameter value and the second parameter value.

19 Claims, 5 Drawing Sheets

ADAPTIVE FREQUENCY CORRELATION ESTIMATION FOR CHANNEL ESTIMATION

BACKGROUND INFORMATION

A user equipment (UE) may be configured to establish a connection to at least one of a plurality of different networks or types of networks to perform a variety of different functionalities via the network connection. For example, the UE may communicate with another UE through the network connection. In another example, the UE may communicate with various servers to exchange data.

When the UE has established a connection with the network, the UE may receive multiple subframes over a channel. To aid in the estimation of the channel's characteristics, cell-specific reference signals, such as pilot symbols, are inserted in various subframes in both time and frequency. The reference signals provide an estimate of the characteristics of the channel at given locations within a subframe. Through interpolation, the channel is estimated across an arbitrary number of subframes.

SUMMARY

The present application discloses a device, system and apparatus for adaptive frequency correlation estimation for channel estimation. In a first aspect, a method is disclosed where a user device ("UE") determines a value of a first parameter and determines a value of a second parameter to select a regularization method for correlation estimate values based on the first parameter value and the second parameter value.

In a second aspect, a UE is disclosed. The UE may have a processor configured to determine a value of a first parameter and determine a value of a second parameter to select a regularization method for correlation estimate values based on the first parameter value and the second parameter value.

In a third aspect, method is disclosed where a UE may receive a wireless signal from a network, the wireless signal having a plurality of subframes. The UE may then determine a delay spread, a Doppler spread and a signal to noise ratio ("SNR") based on the wireless signal and select one of a first regularization method, a second regularization method or a third regularization method based on the delay spread, the Doppler spread, and the SNR, where the one of the regularization methods is used to perform a channel estimation for the wireless signal.

DETAILED DESCRIPTION

Figure 1:
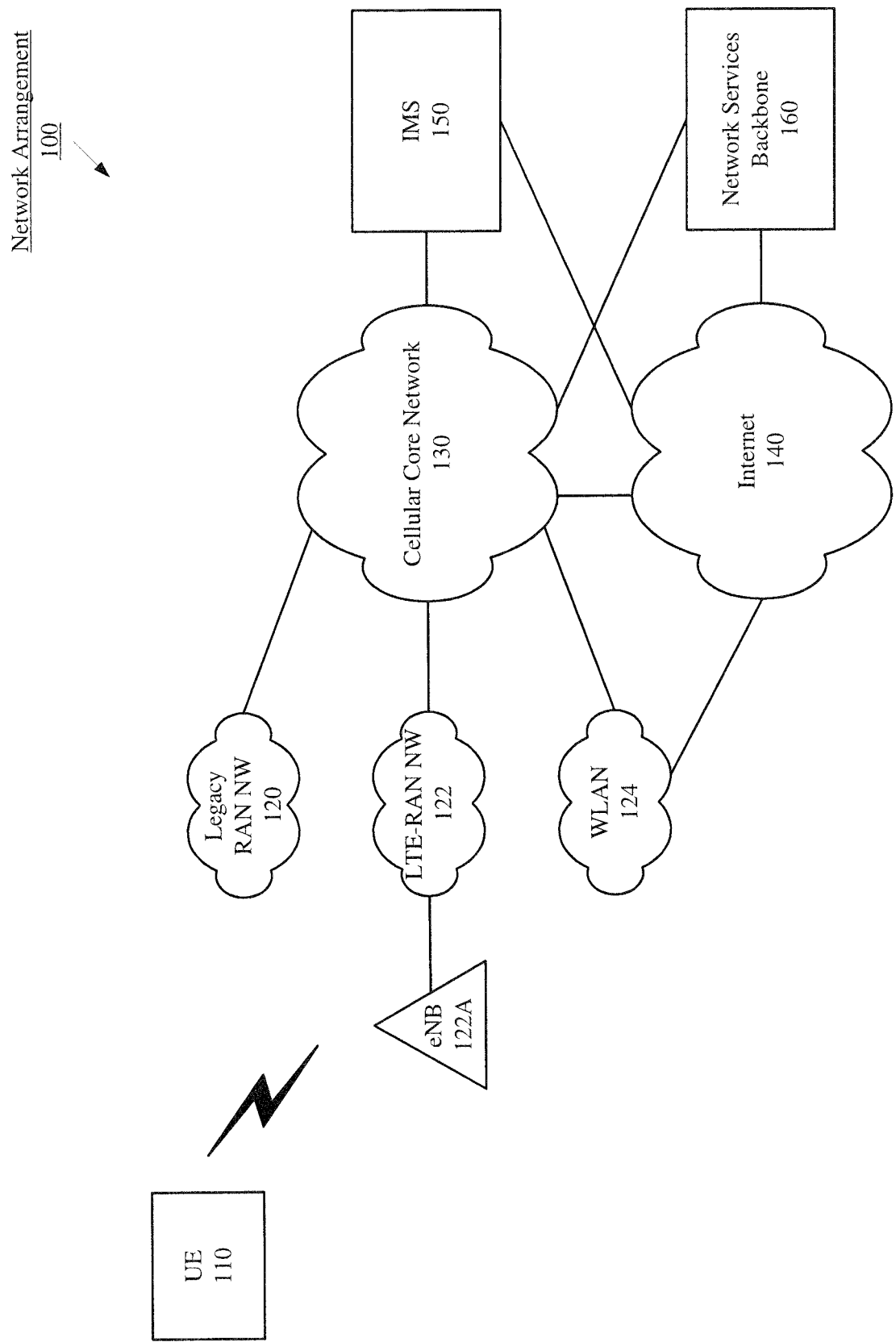
FIG. 1 shows a network arrangement according to various exemplary embodiments described herein.

The exemplary embodiments may be further understood with reference to the following description and the related appended drawings, wherein like elements are provided with the same reference numerals. The exemplary embodiments are related to a device, system, and method for adaptive frequency correlation estimation for channel estimation. Specifically, as will be described in further detail below, the exemplary embodiments are related to multiple stages of channel estimation and adaptive selection methods of regularization methods within certain stages of the channel estimation.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as demodulation, decoding, channel estimation, etc. Therefore, the UE as described herein is used to represent any electronic component.

Further, it is noted that the exemplary embodiments are described with regard to the network being a LTE network and the base station of the network being an evolved Node B ("eNB"). However, it should be noted that the use of the LTE network and the eNB is merely for illustrative purposes. Those skilled in the art will understand that the network may be any network and the base station may be any type of base station within the corresponding network.

The exemplary embodiments may be described with regard to the transmission and reception of control channels and channel estimation. Specifically, in channel estimation, reference signals may be used to estimate the channel for data resource elements based on a time and a frequency correlation. However, the use of control channels are merely for illustrative purposes and the exemplary embodiments may apply to any type of telecommunication channel (e.g., shared channel, data channel, etc.). Further, as discussed above, channel estimation may use cell-specific reference signals ("CRS"), such as pilot symbols, to estimate characteristics of the control channels. As such, it should be noted that exemplary embodiments will be described with regard to the reference signals being pilot symbols. However, the use of the pilot symbols is merely for illustrative purposes and those skilled in the art will understand that the reference signals may be any type of reference signals used by a particular type of network.

It should be understood that channel estimation may use multiple interpolation stages. As known by those skilled in the art, a UE may receive a resource grid, e.g., a frame, containing multiple sub-frames. The frame may contain one or more pilot symbols that are located in different subframes along the frame (e.g., dispersed along different frequencies and times along the frame). The UE may extract and/or measure a variety of network parameters from the pilot symbols. The network parameters may include filter coefficients of channel estimation, such as a delay spread ("Ds"), a Doppler spread ("Fd"), etc., a reference signal received power ("RSRP"), a received signal strength indicator ("RSSI"), a reference signal received quality ("RSRQ"), a channel state information ("CSI"), a channel quality indicator ("CQI"), a rank indicator ("RI"), a precoding matrix indicator ("PMI"), etc. The UE 110 may perform one or more interpolations on the frame to determine network parameters of subframes not containing pilot symbols. To perform an interpolation, the UE may apply a frequency filter or a time domain filter on the frame or a section of the frame. The frequency filter may use a frequency correlation to improve a signal to noise ratio ("SNR") of the UE and interpolate parameters of other subframes within the frame.

The time domain filter may use time correlation to interpolate parameters of other subframes within the frame. The exemplary embodiments relate to an improved frequency correlation. Specifically, to an improved regularization process when determining the frequency correlation.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices (e.g., Category-M or Category M1), etc. It should also be understood that an actual network arrangement may include any number of UEs being used by any number of users. Thus, the example of a single UE 110 is merely provided for illustrative purposes.

The UE 110 may be configured to communicate directly with one or more networks. In the example, the networks with which the UE may wirelessly communicate are a legacy radio access network (RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. With regards to the exemplary embodiments, the UE 110 may establish a connection with the LTE-RAN 122. For example, the UE 110 may have a LTE chipset and communicate with the LTE-RAN 122 via the eNB 122a.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The exemplary embodiments relate to the UE 110 connecting to the LTE-RAN 122 via an evolved Node B (eNB) 122A. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UEs 110-114 may associate with a specific access point (e.g., the eNB 122A of the LTE-RAN 122).

The eNB 122A may be configured to exchange data with the UE 110 through scheduled data transmissions defined using control information. For example, the eNB 122A may transmit scheduling information for data exchange via a physical downlink control channel (PDCCH) and the data corresponding to the scheduling information via a physical downlink shared channel (PDSCH). The eNB 122A may also exchange the data that is scheduled in the control information. When receiving data from the eNB 122A (both control information and other types of data), the UE may receive CRS tones, such as pilot symbols, that are present in the bandwidth associated with the network and/or base station which are present in each transmission time interval (TTI). Using the pilot symbols, a variety of network parameters may be measured by the UE. For example, the pilot symbols may be used in measuring parameters used for filter coefficients of channel estimation, such as a Ds and a Fd, and in measuring various network parameters such as a RSRP, a RSSI, a RSRQ, a CSI, a CQI, a RI, a PMI, etc. The eNB 122A may broadcast the pilot symbols during each TTI, whether or not there is data scheduled to be exchanged with the UE 110. Accordingly, the UE 110 may receive the pilot symbols when monitoring for them.

It should be noted that while pilot symbols may be transmitted over a PDSCH scheduled by a PDCCH during narrow bandwidth operations, certain devices may utilize a different type of tone and a different type of channel. For example, CAT-M1 devices support narrow bandwidth operations and use the CAT-M1 physical downlink control channel ("MPDCCH"). The MPDCCH may schedule the PDSCH and may utilize demodulation reference signals ("DMRS"). It should be noted that the use of these channels and corresponding reference signals is merely for illustrative purposes and the exemplary embodiments may utilize any type of communication channel and any type of corresponding reference signal.

Figure 2:
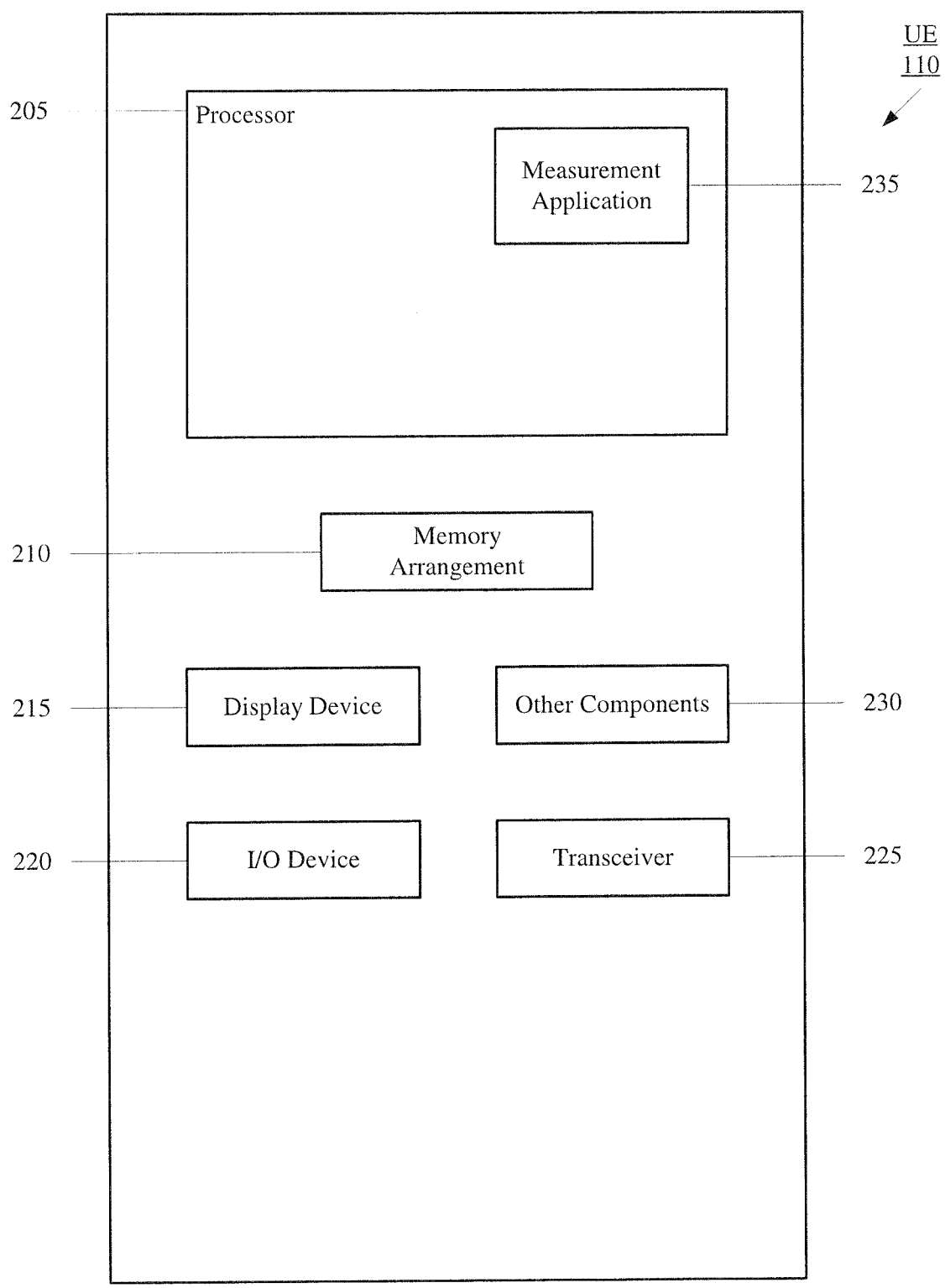
FIG. 2 shows a user equipment according to various exemplary embodiments described herein.

FIG. 2 shows an exemplary UE 110 according to various exemplary embodiments. The UE 110 may be any electronic component that is configured to connect to a network and perform wireless functionalities. For example, the UE 110 may be a portable device such as a phone, a smartphone, a tablet, a phablet, a laptop, a wearable computing device, an Internet of Things (IoT) device (e.g., Category-M or Category M1), Machine-Type Communication (MTC) devices, enhanced MTC (eMTC) devices, etc. In another example, the UE 110 may be a stationary device such as a desktop terminal. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a measurement application 235. The measurement application 235 may be configured to determine a variety of different measurements such as a channel estimation, a Doppler spread, a delay spread, etc. Those skilled in the art will understand how these measurements may be determined using any suitable calculation or algorithm.

It should be noted that the measurement application being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor.

The memory 210 may be a hardware component configured to store data related to operations performed by the UE 110. As will be described in further detail below, the memory 210 may store data that corresponds to the number of subframes that may be needed to successfully perform certain operations (e.g. channel estimation, demodulation, decoding, etc.) based on a variety of factors. However, the use of the memory 210 is only exemplary and the UE 110 may store this data within another component or module within the UE 110 or in a component that is external to the UE 110.

The transceiver 225 may be a hardware component configured to exchange data with the eNB 122A. For example, the transceiver 225 may be configured to receive DMRS or CRS tones that are broadcast by the eNB 122A within the overall bandwidth of the LTE-RAN 122, more specifically within the assigned narrow bandwidth range. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). Thus, an antenna (not shown) coupled with the transceiver 225 enables the transceiver 225 to operate on the LTE frequency band.

As noted above, the processor 205 may be a baseband processor. The baseband processor 205 may perform subsequent operations to demodulate signals received via the transceiver 225. Accordingly, the baseband processor 205 may include a channel estimation unit. The channel estimation unit may be a component of the measurement application 235 configured to estimate a channel coefficient. The measurement unit may also be a component of the measurement application 235 configured to estimate a RSRP, a RSSI, a RSRQ, a CQI, a RI, a PMI, etc. as well as other subsequent measurements.

Figure 3:
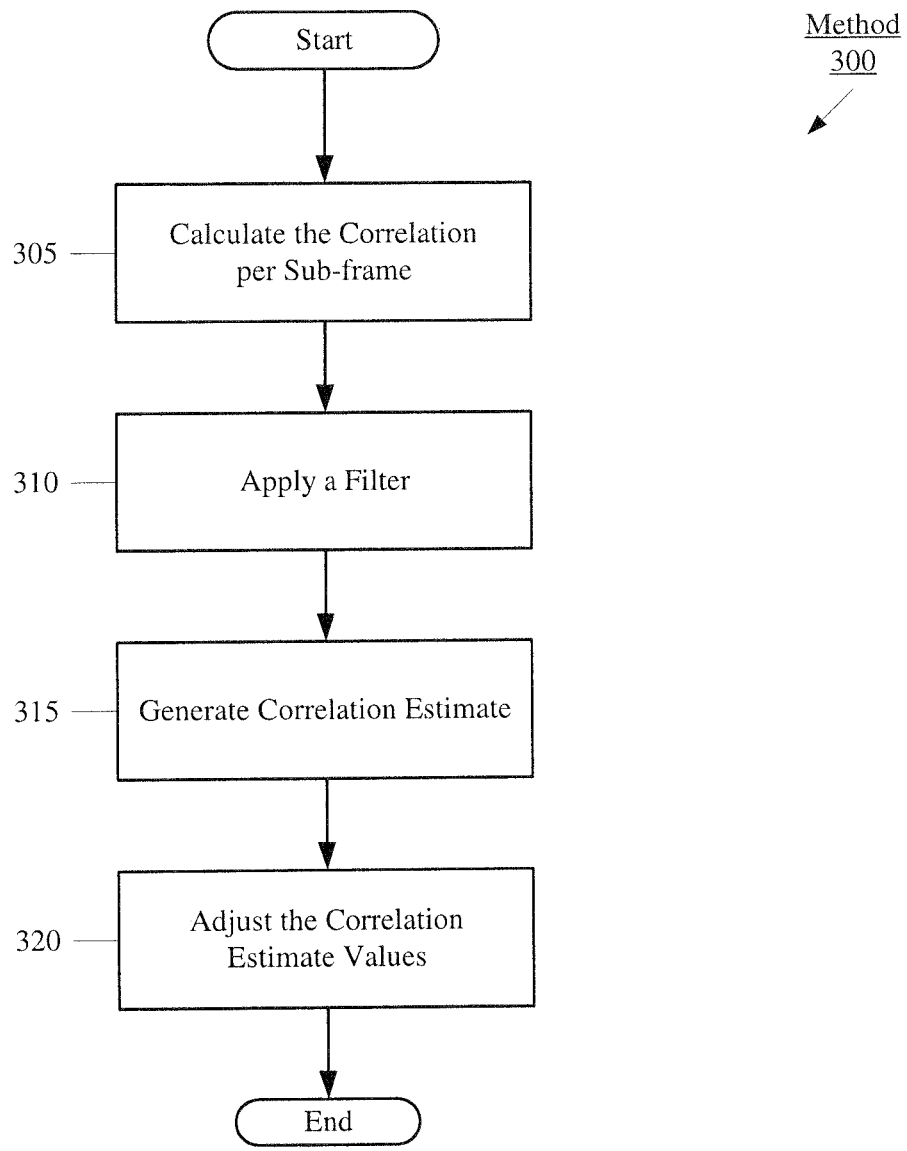
FIG. 3 shows a method of determining a frequency correlation according to various exemplary embodiments described herein.

FIG. 3 shows a method 300 for determining a frequency correlation according to various embodiments described herein. The method of FIG. 3 will be discussed with reference to FIG. 4, which shows an exemplary process 400 of determining a frequency correlation matrix using the method 300 of FIG. 3.

Figure 4:
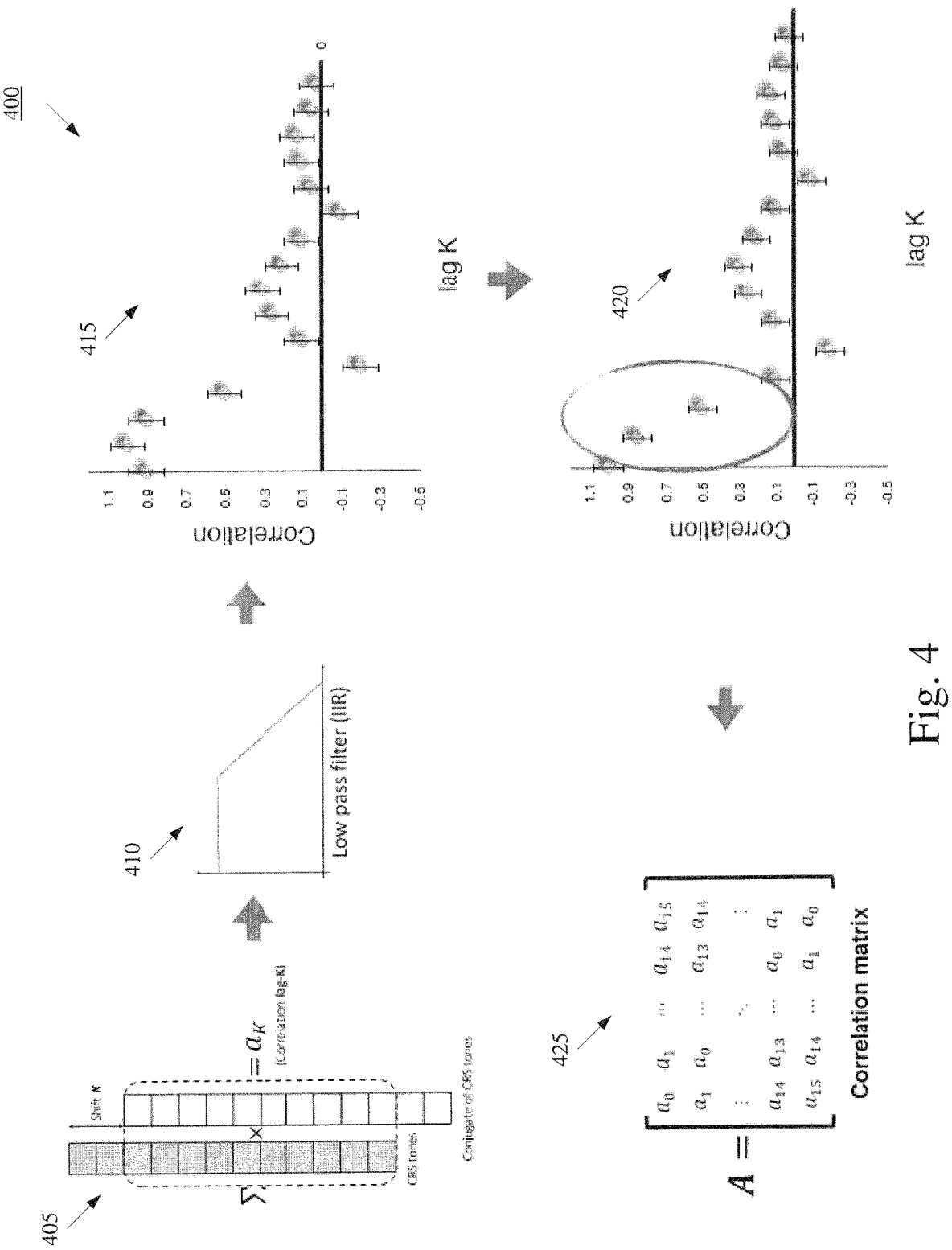
FIG. 4 shows an exemplary process of determining a frequency correlation matrix according to various exemplary embodiments described herein.

In 305, a correlation per subframe is calculated for different frequency shifts. An example of the correlation is shown in 405. Specifically, for each of the CRS tones a conjugate is determined and the conjugate is shifted in frequency. The product of the CRS tones and frequency shifted conjugate is then determined. As shown in FIG. 4, this product is $a_k$ (e.g., a correlation lag) where k is the frequency shift. As shown in the example of FIG. 4, the example shift k is equal to the frequency width of two (2) resource elements. This calculation is performed over the whole range of frequency shifts from k=0 to k=N.

In 310, the correlation for each subframe may be passed through a filter by the measurement application 235 to filter out any values for the CRS tones that are outside an expected range. The filter may be applied to improve the reliability of the correlation per subframe from 305. An example of the filter, specifically a low pass filter, is shown in 410 of FIG. 4. In the exemplary embodiment, the low pass filter is an infinite impulse response ("IIR") filter. However, those skilled in the art will understand that other types of filters may also be used, e.g., a finite impulse response ("FIR") filter, etc.

In 315, the measurement application 235 may generate a correlation estimate. The correlation estimate may be determined after a sufficient number of samples have accumulated over time. The amount of time and the number of samples may be dependent on any number of parameters, such as channels being used, mobility of device, etc. An example of generating the correlation estimate is shown in 415 of FIG. 4. In an exemplary embodiment, the correlation estimate may be generated by using an amplitude clipping and filtering ("ACF") technique.

In 320, the correlation estimate values may be adjusted or skewed to optimize performance. The adjustment will be referred to herein as a regularization or a regularization method. There may be different types of regularization that are applied to the correlation estimate. As will be described in more detail below, the different types may depend on channel conditions. The regularized correlation estimate values may then be inserted into the correlation matrix (A) 425 as shown in FIG. 4. This correlation matrix may then be used for channel estimation as was described above.

A first example of a regularization method, which will be referred to as regularization method A, may involve using following formula:

for k=1 to N−1 if $(a_0+n_{var}) < \sigma^* |a_k|$ $a_k = \text{sign}(a_k)^*(a_0+n_{var})/\sigma$ where: k=frequency shift value
N=number of frequency shift values
σ=fixed value
$n_{var}$=noise variance As can be seen from the above formula, in regularization method A, each of the correlation estimate values may be adjusted individually. For example, as seen in 420 of FIG. 4, each of the sixteen (16) ACF values may be input into the formula to produce sixteen (16) regularized correlation estimate values.

The value of σ in regularization method A is a fixed value. In an exemplary embodiment, the value of σ may be 1.1 but those skilled in the art would understand that any fixed value may be used for σ. However, since the value of σ is fixed, the throughput may be limited when the SNR of the signals received by the UE 110 increases. As such, it may be desirable to implement a regularization method with an adjustable value rather than a fixed value.

In a second exemplary embodiment, which will be referred to as regularization method B, the regularization involves using the following formula:

$a_{max}$=max $|a_k|$, for k=1 to N−1 if $(a_0+n_{var}) < \beta^* a_{max}$ $a_0 = \beta + a_{max} - n_{var}$ where β=adjustable value
k=frequency shift value
N=number of frequency shift values
$n_{var}$=noise variance In regularization method B, each of the correlation estimate values may be adjusted in a single batch (e.g., all at once). For example, as seen in 420 of FIG. 4, all of the sixteen (16) correlation estimate values may be regularized together based on the $\beta + a_{max} - n_{var}$. Those skilled in the art will understand that the adjusting may be performed as a result of an effect of determining $a_0$ within the correlation matrix. For example, when the value of $a_0$ is determined (e.g., $a_0=\beta+a_{max}-n_{var}$), the remaining "a" values within the correlation matrix are similarly affected.

Furthermore, in regularization method B, the value of p is an adjustable value. The value may be selected from a pool of preset values (e.g., such as 1.02, 1.04, 1.1, etc.) in response to a triggering condition. For example, the triggering condition may be a network parameter crossing a threshold. In an example, the value of β may be adjustable based on the SNR. When the SNR increases and hits a threshold, the measurement application 235 may decrease the value of β where the decrease may include the value of β dropping from an initial value to a next preset value (e.g., from 1.1 to 1.04).

The regularization method B may be more robust that regularization method A when the correlation matrix is ill-conditioned (e.g., the frequency correlation is large, the correlation estimate is less accurate, etc.). As such, regularization method B may be superior to regularization method A when the channel is highly correlated.

In a third exemplary embodiment, which will be referred to as regularization C, the regularization may involve using the following formula:
for k=1 to N−1 if $(a_0+n_{var})<\beta*|a_k|$ $a_k=\text{sign}(a_k)*(a_0+n_{var})/\beta$ where β=adjustable value
k=frequency shift value
N=number of frequency shift values
$n_{var}$=noise variance Regularization method C uses the same general formula of regularization method A where the fixed σ is replaced by the adjustable β. Similar to regularization method B, the value of β may be selected from a pool of preset values (e.g., such as 1.02, 1.04, 1.1, etc.) in response to a triggering condition (e.g., value of the SNR). As described above, the constant σ of regularization method A may limit throughput as SNR increases. Thus, the varying β of regularization method C solves this issue by using a smaller β as the SNR increases.

As described above, the regularization of the correlation estimate values may be used to generate a correlation matrix 425. The correlation matrix 425 may then be applied to the frame to improve the SNR of the UE 110 and to interpolate network parameters of subframes not containing pilot symbols in the frame.

Figure 5:
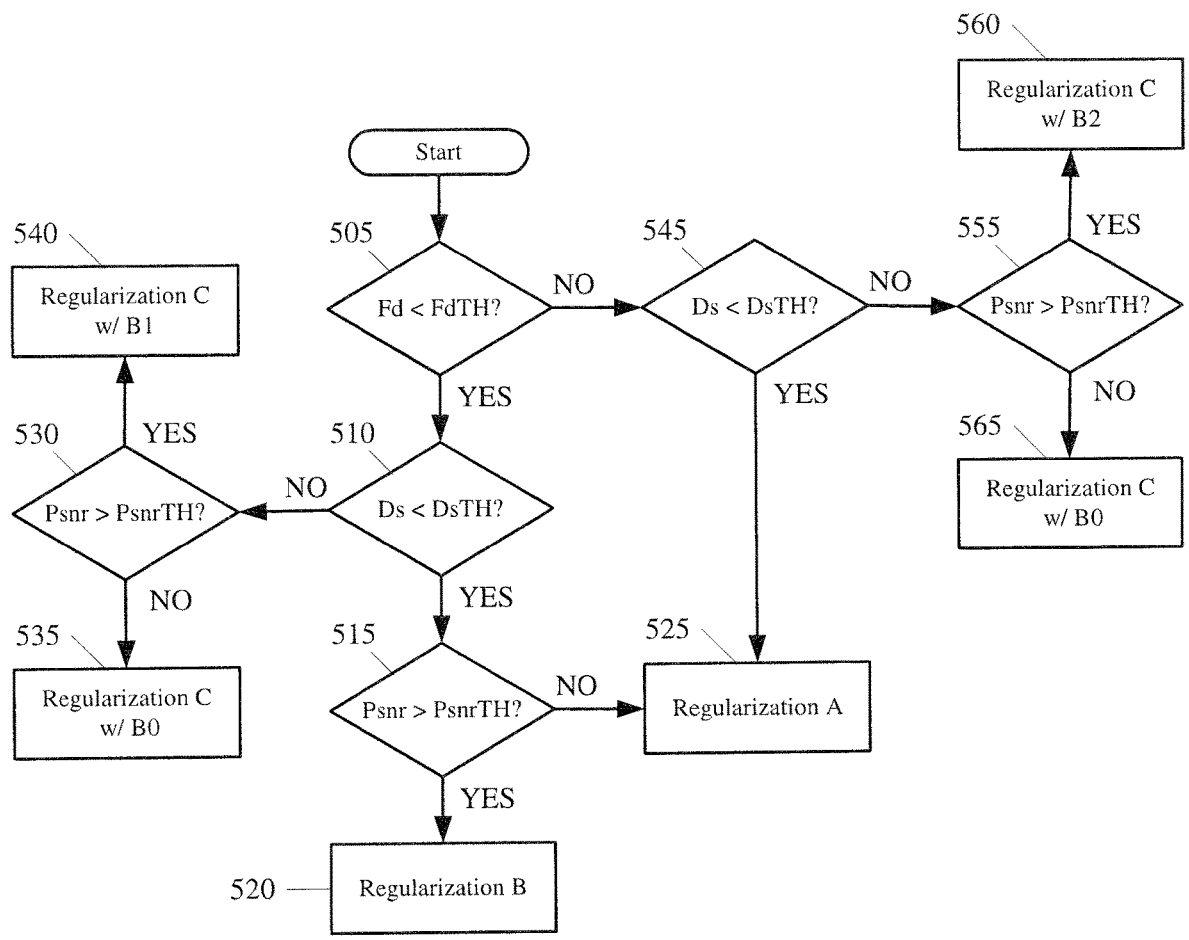
FIG. 5 shows a method of adaptively selecting a regularization method for correlation estimates according to various exemplary embodiments described herein.

Each of the regularization methods described above may have specific advantages and disadvantages. As such, a method 500 for adaptively selecting the regularization method is shown in FIG. 5. It should be noted that FIG. 5 will assume that the Fd (Doppler Spread) and the Ds (delay spread) of the UE 110 have already been determined by the measurement application 235. However, those skilled in the art would understand that the Fd and the Ds may be determined at any time prior or during method 500.

In 505, the UE 110 may determine whether the Fd is below a Fd threshold ("$Fd_{TH}$"). When it is determined that the Fd is less than the $Fd_{TH}$, the method 500 may move to 510, where the UE 110 may determine whether the estimated Ds is below a Ds threshold ("$Ds_{TH}$"). When it is determined that the Ds is less than the $Ds_{TH}$, the method 500 may then move to 515, where the UE 110 may determine whether an estimated SNR ("PSNR") is greater than an PSNR threshold ("$PSNR_{TH}$"). When it is determined that the PSNR is greater than the $PSNR_{TH}$, the UE 110 may enable regularization method B 520. When it is determined that the PSNR is less than the $PSNR_{TH}$, the UE 110 may enable regularization method B 525.

Thus, as described above, when conditions 505 (Fd) and 510 (Ds) are satisfied, it may be considered that the channel is highly correlated. When condition 515 (SNR) is satisfied, it may be considered that the SNR is relatively good and the adjustable β should be used so as not to limit throughput. Thus, since all these conditions are satisfied, the regularization method B is used that offers advantages for highly correlated channels with a relatively high SNR. It should be noted that there may be other operations associated with regularization method B for selecting the particular β that is to be used (e.g., based on specific SNR values). These operations are not shown in method 500 for regularization B, but will be described later when discussing regularization method C and it should be understood that the manner of selecting a β value for regularization method C is equally applicable to regularization method B.

Returning to 515, when the PSNR is less than the $PSNR_{th}$, the method may proceed to 525 where the regularization method A is selected. In this situation, even though the channel is highly correlated, the SNR may be considered relatively low and therefore, the fixed value of σ and the individual adjustment of the correlation estimate values will not affect throughput and, thus, regularization method A will be selected.

Returning to 510, when the Ds is greater than the $Ds_{TH}$, this means the delay spread is relatively high and the regularization method C will be selected. However, the values of β for use with the regularization method C need to be selected. Thus, the method 500 may move to 530, where the UE 110 may determine whether the PSNR is greater than the $PSNR_{TH}$. When it is determined that the PSNR is less than the $PSNR_{TH}$, the UE 110 may enable regularization C 535. In an exemplary embodiment, the UE 110 may enable regularization C and set the value of β to a first predetermined value. When it is determined that the PSNR is greater than the $PSNR_{TH}$, the UE 110 may enable regularization method C 540. In an exemplary embodiment, the UE 110 may enable regularization method C and set the value of β to a second predetermined value. As described above, as the SNR increases, the β value will be set lower so as not to limit throughput.

Returning to 505, when it is determined that the Fd is greater than the $Fd_{TH}$, the method 500 may move to 545, where the UE 110 may determine whether the estimated Ds is less than the $Ds_{TH}$. When it is determined that the estimated Ds is less than the $Ds_{TH}$, the UE 110 may enable regularization method A 525. When it is determined that the estimated Ds is greater than the $Ds_{TH}$, the UE 110 may determine whether the PSNR is greater than the $PSNR_{TH}$. When it is determined that the PSNR is greater than the $PSNR_{TH}$, the UE 110 may enable regularization method C 560. In an exemplary embodiment, the UE 110 may enable regularization method C and set the value of β to a third predetermined value. When it is determined that the PSNR is less than the $PSNR_{TH}$, the UE 110 may enable regularization method C 565. In an exemplary embodiment, the UE 110 may enable regularization method C and set the value of β to the first predetermined value.

Those skilled in the art would understand that method 500 is merely an exemplary embodiment to demonstrate how a regularization method may be selected using various parameters (e.g., Fd, Ds and SNR). A number of different parameters may used to select any combination of regularization methods.

It should be understood that regularization methods A, B and C are only exemplary. A person skilled in the art would be fully capable of adjusting any or all of the values, parameters or formulas of regularization methods A, B and C to include or operate using different network parameters or variables, such as a RSRP, a RSSI, a RSRQ, a CSI, a CQI, a RI, a PMI, etc. in accordance with the principles described for using or selecting a particular regularization method. Furthermore, a person skilled in the art would be fully capable of adding additional regularization methods or removing regularization methods from method 500 depending on certain conditions or preferences.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a user equipment ("UE"),
determining a value of a first parameter;
determining a value of a second parameter;
comparing the first parameter value to a first threshold and the second parameter value to a second threshold; and
selecting a first regularization method of a plurality of regularization methods available for selection by the UE, the selection being based on the comparisons of the first parameter value to the first threshold and the second parameter value to the second threshold, wherein the selected regularization method is applied to correlation estimate values to generate regularized correlation estimate values that are to be used to perform channel estimation on a wireless signal.

2. The method of claim 1, further comprising:
determining a value of a third parameter.

3. The method of claim 2, wherein the selecting is further based on the third parameter value.

4. The method of claim 2, further comprising:
selecting a value of an operator to be used in the selected regularization method based on the third parameter value.

5. The method of claim 4, wherein the selecting the value of the operator comprises:
comparing the third parameter value to a threshold; and
selecting the value of the operator based on the comparison.

6. The method of claim 2, wherein the third parameter is a signal-to-noise ratio ("SNR").

7. The method of claim 1, wherein the first parameter is a Doppler spread and the second parameter is a delay spread.

8. The method of claim 1, wherein the plurality of regularization methods comprises a first regularization method where all correlation estimate values are skewed by a same amount and a second regularization method where the correlation estimate values are regularized individually.

9. A user equipment ("UE"), comprising;
a processor configured to:
determine a value of a first parameter;
determine a value of a second parameter;
compare the first parameter value to a first threshold and the second parameter value to a second threshold; and
select a first regularization method of a plurality of regularization methods available for selection by the UE, the selection being based on the comparisons of the first parameter value to the first threshold and the second parameter value to the second threshold, wherein the selected regularization method is applied to correlation estimate values to generate regularized correlation estimate values that are to be used to perform channel estimation on a wireless signal.

10. The UE of claim 9, wherein the processor is further configured to:
determine a value of a third parameter.

11. The UE of claim 10, wherein the processor is further configured to:
select the regularization method based on the third parameter value.

12. The UE of claim 10, wherein the processor is further configured to:
select a value of an operator to be used in the selected regularization method based on the third parameter value.

13. The UE of claim 12, wherein the processor is further configured to select the value of the operator by:
comparing the third parameter value to a threshold; and
selecting the value of the operator based on the comparison.

14. The UE of claim 10, wherein the first parameter is a Doppler spread, the second parameter is a delay spread and the third parameter is a signal-to-noise ratio ("SNR").

15. A method, comprising;
at a user equipment ("UE"),
receiving a wireless signal from a network, the wireless signal comprising a plurality of subframes;
determining a delay spread value, a Doppler spread value and a signal to noise ratio ("SNR") value based on the wireless signal;
comparing the delay spread value to a first threshold, the Doppler spread value to a second threshold, and the SNR value to a third threshold; and
selecting a first regularization method of a plurality of regularization methods available for selection by the UE based on the comparisons of the delay spread value to the first threshold, the Doppler spread value to the second threshold, and the SNR value to the third threshold, wherein the selected regularization method is used to perform a channel estimation for the wireless signal.

16. The method of claim 15, wherein the plurality of the regularization methods includes a first regularization method, the first regularization method comprises:
determining a first value based on a first correlation estimate value and a noise variance;
determining a second value based on a fixed value and a correlation lag;

when the first value is less than the second value, adjusting the correlation lag based on based on the correlation lag, the fixed value, the noise variance and the first correlation estimate value.

17. The method of claim 15, wherein the plurality of the regularization methods includes a second regularization, the second regularization method comprises:
   determining a maximum value of a plurality of correlation lags;
   determining a first value based on a correlation estimate value and a noise variance;
   determining a second value based on an adjustable value and the maximum value; and
   when the first value is less than the second value, adjusting the correlation estimate value based on the adjustable value, the maximum value and the noise variance.

18. The method of claim 17, wherein the adjustable value is selected based on the SNR.

19. The method of claim 15, wherein the plurality of the regularization methods includes a third regularization, the third regularization method comprises:
   determining a first value based on a first correlation estimate value and a noise variance;
   determining a second value based on an adjustable value and a correlation lag;
   when the first value is less than the second value, adjusting the correlation lag based on the correlation lag, the fixed value, the noise variance and the first correlation estimate value.

* * * * *